R. A. A. S. PIERCY.
STAGING OR SUPPORT FOR SUBMARINE OPERATIONS.
APPLICATION FILED NOV. 27, 1909.
1,128,039.
Patented Feb. 9, 1915.
5 SHEETS—SHEET 1.
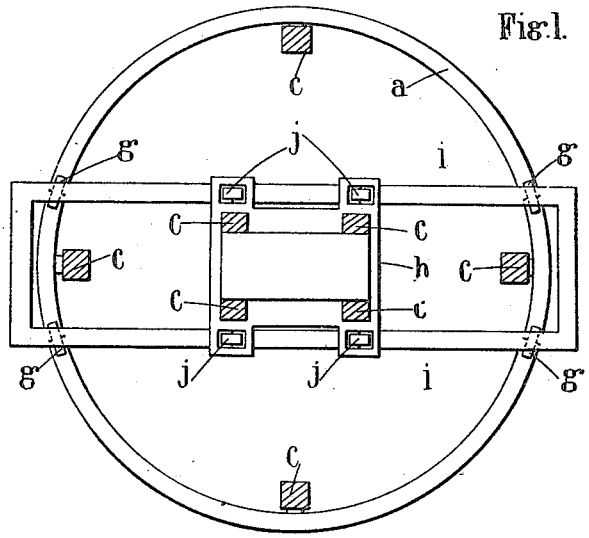
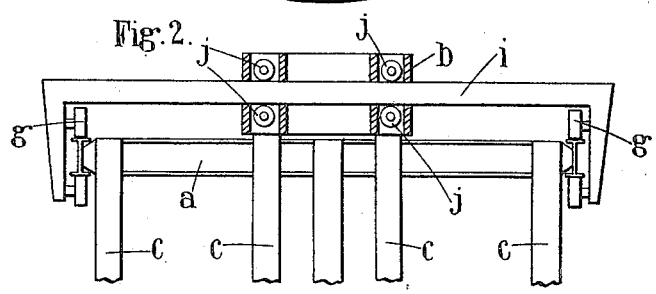
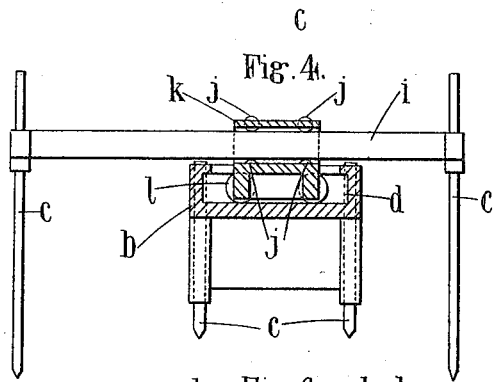
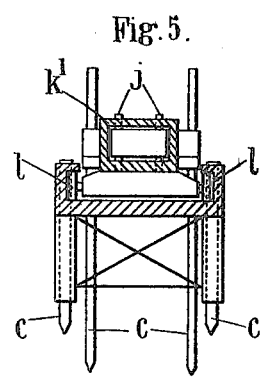
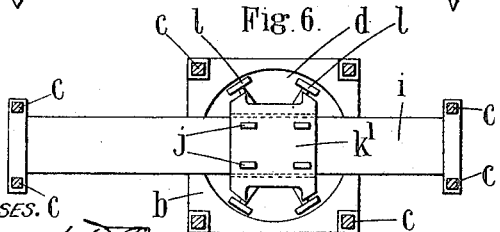
WITNESSES.
INVENTOR,
Robert A.A.S. Piercy,
BY
ATTY.

R. A. A. S. PIERCY.
STAGING OR SUPPORT FOR SUBMARINE OPERATIONS.
APPLICATION FILED NOV. 27, 1909.
1,128,039.
Patented Feb. 9, 1915.
5 SHEETS—SHEET 2.
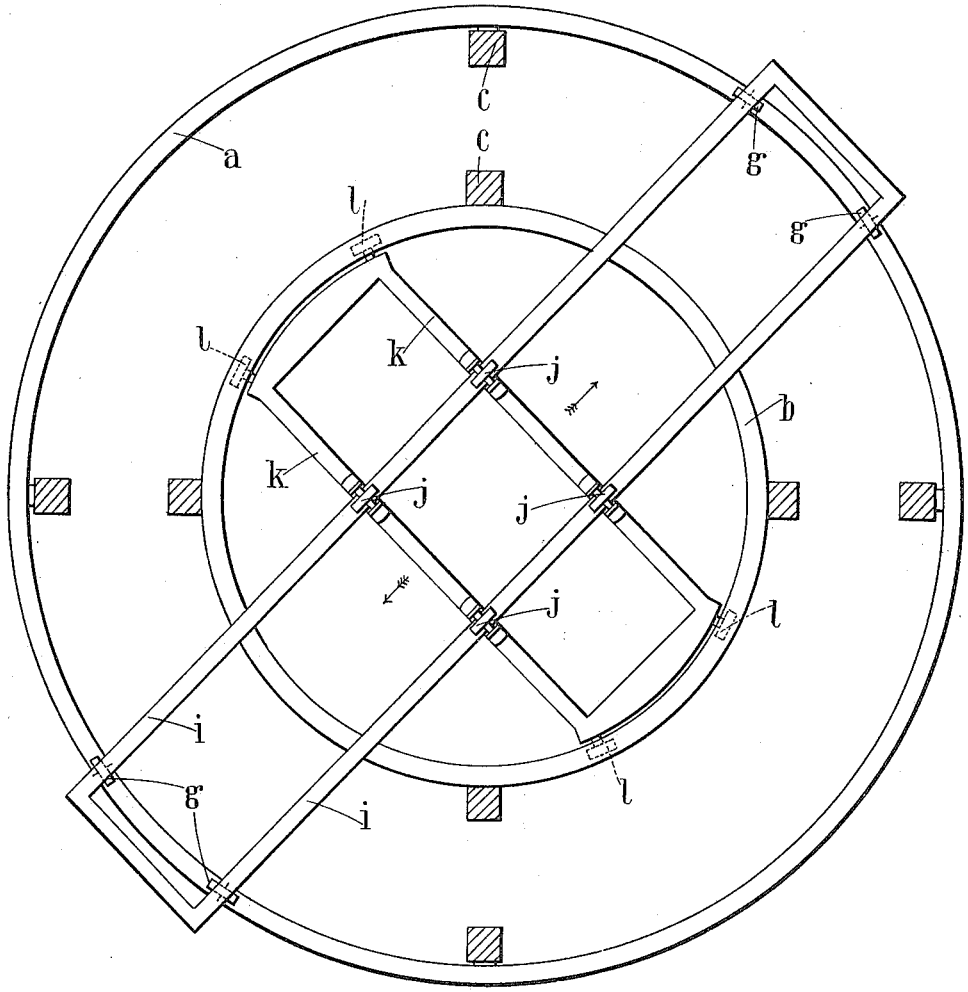
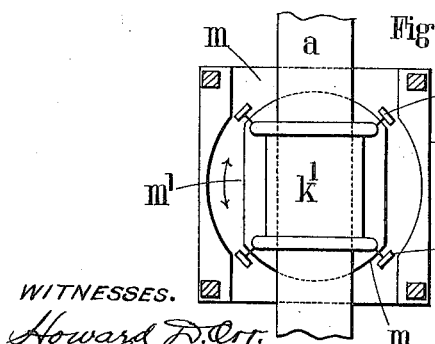
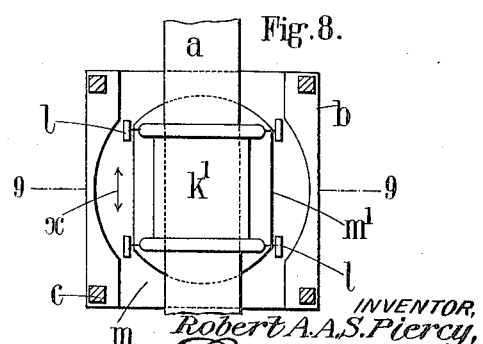

R. A. A. S. PIERCY.
STAGING OR SUPPORT FOR SUBMARINE OPERATIONS.
APPLICATION FILED NOV. 27, 1909.
1,128,039.
Patented Feb. 9, 1915.
5 SHEETS—SHEET 3.
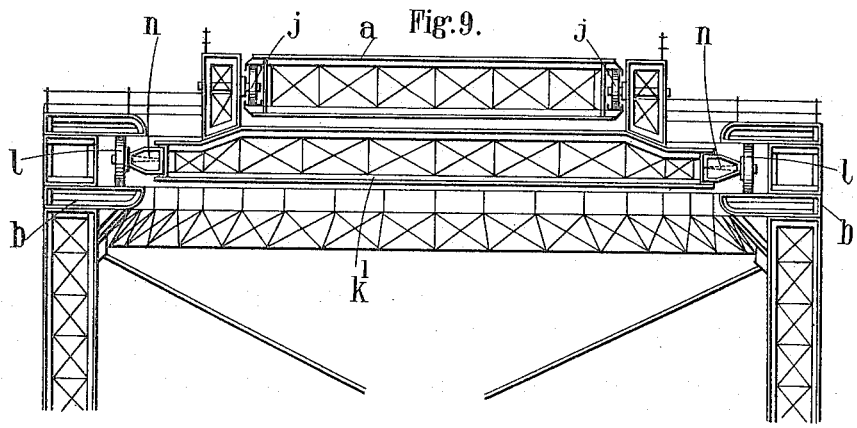
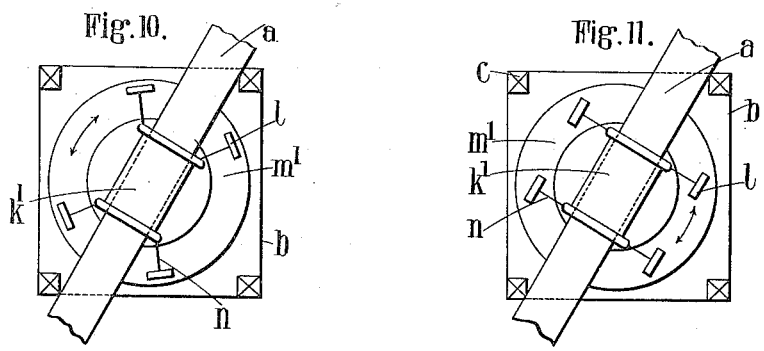
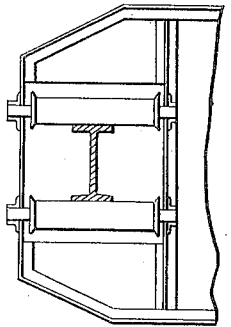
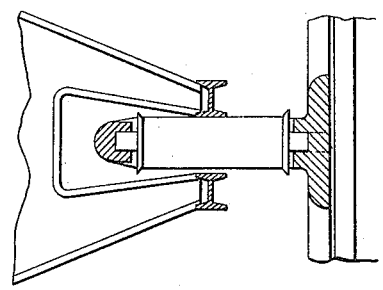
WITNESSES.
INVENTOR,
Robert A. A. S. Piercy,
BY
ATTY.

R. A. A. S. PIERCY.
STAGING OR SUPPORT FOR SUBMARINE OPERATIONS.
APPLICATION FILED NOV. 27, 1909.
1,128,039.
Patented Feb. 9, 1915.
5 SHEETS—SHEET 4.
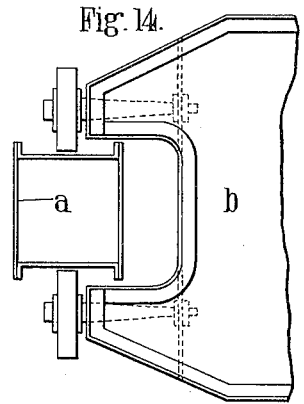
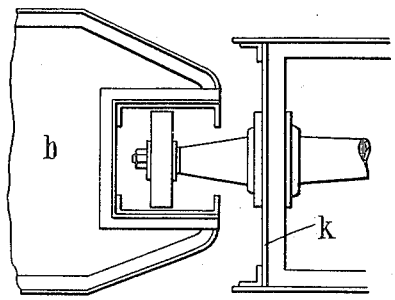
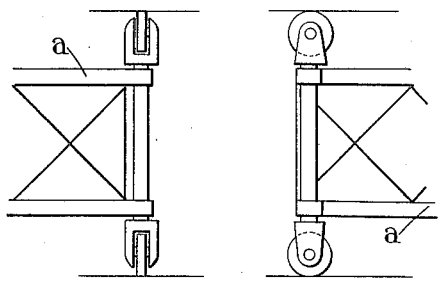
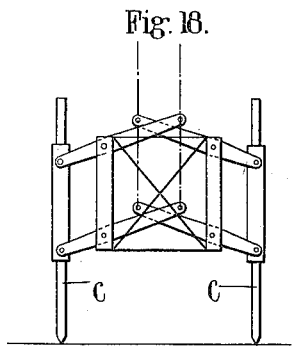
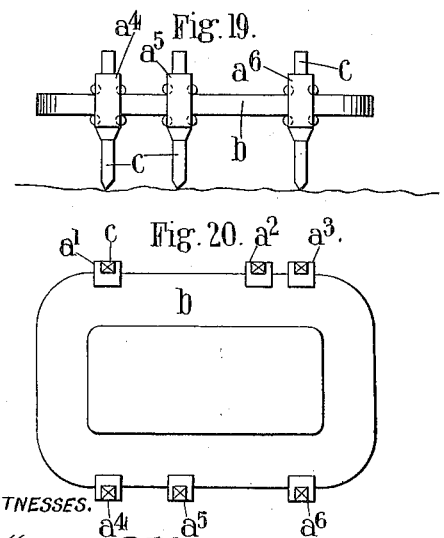
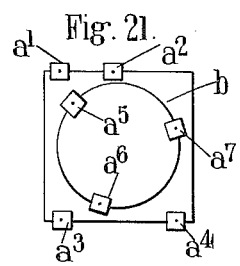

R. A. A. S. PIERCY.
STAGING OR SUPPORT FOR SUBMARINE OPERATIONS.
APPLICATION FILED NOV. 27, 1909.
1,128,039.
Patented Feb. 9, 1915.
5 SHEETS—SHEET 5.
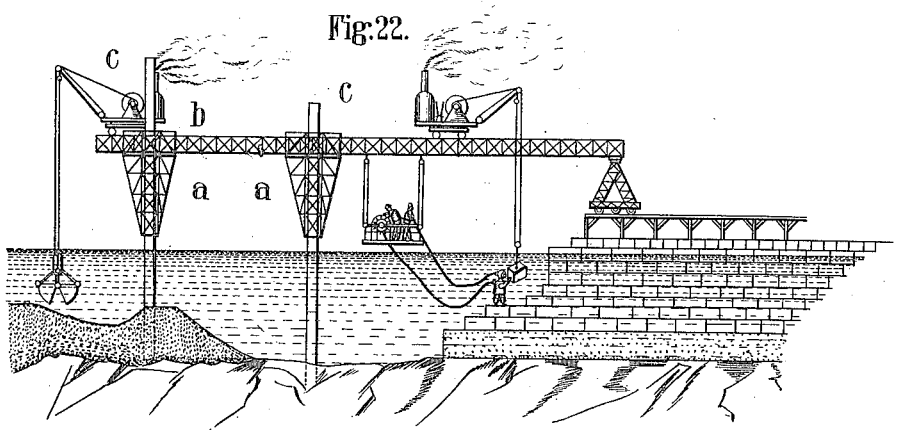

UNITED STATES PATENT OFFICE.

ROBERT ALWYN ARNOLD STEPHEN PIERCY, OF SCRUBWOOD, WENDOVER, ENGLAND.

STAGING OR SUPPORT FOR SUBMARINE OPERATIONS.

1,128,039. Specification of Letters Patent. Patented Feb. 9, 1915.

Application filed November 27, 1909. Serial No. 530,173.

*To all whom it may concern:*

Be it known that I, ROBERT ALWYN ARNOLD STEPHEN PIERCY, a subject of His Majesty the King of England, residing at Far Ben, Scrubwood, Wendover, in the county of Buckingham, Kingdom of England, have invented certain new and useful Improvements in and Relating to Stagings or Supports for Submarine Operations, of which the following is a specification.

This invention has reference to improvements in stagings or supports for submarine boring, blasting, pile-driving, block-setting and like operations, and relates especially to stagings or supports of the kind described in Letters Patent 968,975, granted to me on August 30, 1910, and wherein is described a staging comprising two structures normally resting on the sea or other bottom which are capable of being moved relatively to each other.

Now the present invention has for its object to enlarge the scope of working of such structures by so connecting together or combining the component parts with each other that greater freedom of movement is obtainable and wherein complete rotary or universal movement in a substantially horizontal plane is possible.

In carrying out the present invention the complete structure consists of a combination of two or more component parts movable on each other, and the locomotion of the whole combination is effected by moving the component parts relatively to one another, while one or the other of the component part or parts alternately gives support to the whole structure, the parts being so connected that either may be made to describe a complete circle in a horizontal plane while supported by the other.

The various arrangements and combination of the parts forming the complete stagings or supports constructed in accordance with the present invention and for the purpose of carrying out the objects set forth are hereinafter referred to with reference to the accompanying sheets of drawings in which:—

Figure 1 is a diagrammatic plan of a complete staging or support wherein the two main component parts are each capable of being completely rotated relatively to the other and be supported by or support that other; Fig. 2 is a sectional side elevation thereof; Fig. 3 is a view similar to Fig. 1 of a slightly modified form of construction wherein a larger range of motion is possible. Figs. 4, 5 and 6 represent in side elevation, end elevation, and plan, respectively, another modified form of construction. Figs. 7 and 8 are diagrammatic plans showing another slightly modified form of construction wherein the rollers are mounted on swinging brackets turning about vertical spindles. Fig. 9 is a cross section on the line 9—9 of Fig. 8 to an enlarged scale showing also the parts in greater detail; Figs. 10 and 11 are diagrammatic plans showing a construction in which the wheels may be set for a straight line movement in any position (Fig. 11) and for a rotary or radial movement (Fig. 10). Figs. 12, 13, 14 and 15 are detail views illustrating various methods which may be adopted for arranging the rollers and tracks on the respective component parts of the structure. Figs. 16 and 17 are views taken at right angles to each other of the vertical caster form of rollers; Fig. 18 is a detail view showing a method of mounting the spuds or supports on their component parts by means of sets of levers forming parallel motions which may be found very convenient in some cases. Fig. 19 is an elevation and Fig. 20 is a plan of another construction of staging or "bridge frame." Fig. 21 shows in plan a further form of construction; Fig. 22 is a side elevation showing the application in connection with a pier of a staging of the type shown in the previously referred to figures of the drawings.

Like reference letters are employed to indicate like parts throughout the various figures of the drawings as far as application will allow.

Referring more particularly to Figs. 1 and 2 of the drawings, I employ an outer structure $a$ and an inner structure $b$, the outer member or structure being of circular shape and the inner member substantially square in plan view. Each of the members is supported on adjustable spuds or supports $c$ of suitable height according to the use of the structure. The circular outer member is of much larger diameter than the inner member and the inner member is supported on the bridge members $i$ which extend across the outer member. The inner member is provided at its corners with pairs of rollers $j$—$j$ running on the top and bottom of the bridge members in order that it may be moved diametrically across the outer member.

The outer member *a* forms a complete circular track for the pairs of rollers *g*, on the bridge members, which run on the upper and lower sides of the outer member, the spuds or supports *c* for the member being arranged at the inner side of the member and normally terminating below the bridge members. It will thus be seen that the two members or frames can be rotated each about the other through a complete circle while suspended therefrom, and in addition to this movement the inner frame *b* can be moved transversely on the bridge members *i* or vice versa. The inner structure or member *b* is furnished with a platform for carrying tools or other working apparatus.

In the arrangement shown in Fig. 3, both the outer and inner members are circular, and, according to this arrangement, it is possible to rotate the inner frame about its center without moving the bridge members. The bridge members *i i* extend over the outer member in the same manner as shown in Figs. 1 and 2, but the rollers *j* are carried by auxiliary bridge members *k* and the rollers *l* at the ends of the auxiliary bridge members support the inner member *b*.

In Figs. 4, 5 and 6, I show a form of the invention in which the outer member *a* is dispensed with and the spuds or supports *c* are mounted on the bridge members *i* at the four corners thereof. The inner member *b* in this form of apparatus is square in plan view, and has an inner ring or channel member *d* constituting a circular track for the rollers *l* on the auxiliary bridge members upon which the said rollers may run when it is desired to rotate either of the frames. The rollers *j j* are mounted in an open-ended frame *k'* constituting the auxiliary bridge members through which the bridge members *i i*, constituting the outer frame, are slid when the whole staging is being moved from place to place.

In Figs. 7, 8 and 9, a further modification is shown which provides the same movements as are afforded by the constructions previously described. In this form of apparatus, there are three component members *a*, *b* and *k'*. The members *a k'* have the same relative movement as in the other previously described arrangements, and the member *b* is provided with the circular track *m* which is widened at diametrically opposite points, as shown at *m'* whereby straight tracks will be provided. The wheels *l*, in this case, are shown as single wheels running between upper and lower tracks, and are carried by brackets *n* which are pivotally mounted at the corners of the member *k'*. It will be readily seen that if the brackets be disposed radially, as shown in Fig. 7, the relative movement of the members *k'* and *a* will be rotary about the center of the member *b*. If the brackets be turned to the position shown in Fig. 8, the relative movement of the parts will be longitudinal or parallel to the arrow *x*.

Figs. 10 and 11 illustrate a simplified form of track *m'* consisting of a very wide ring. The wheels are mounted on brackets *n* on the member *k'*, as just described, and if arranged radially, as in Fig. 10, the relative movements of the members *b* and *k'* will be rotary. If the brackets are so turned as to bring the wheels into parallelism, as shown in Fig. 11, other movement is possible for any horizontal direction desired, owing to the width of the track. The amount of side travel is limited only by the wheels *l* touching the outer edge of the ring shaped track. By skilfully adjusting the angles of the brackets when arranged radially, and while rotating, it would be possible to attain any sidewise movement simultaneously with the rotary one, thus bringing the inner component to one side or the other of the outer one at the end of any slewing operation or vice versa. It is easily seen that the principle of the combination of movable wheels and fixed tracks may be developed to meet almost any requirements.

Where owing to the nature of the work to be carried out it may not be desirable to employ an outer structure made in one continuous or integral part this difficulty may be overcome by supporting the inner frame on a plurality of trestles or like spud members or units surrounding the inner members as depicted in Figs. 19 and 20 wherein one component *b* or "bridge frame" is employed in conjunction with six components *a* ($a^1$ $a^2$ $a^3$ $a^4$ $a^5$ and $a^6$) each provided with one spud only, and movable on side tracks fixed to the outside of *b*. The outside corners of component parts *b* are rounded, so as to allow any component *a* to travel around them. If three or four components *a* are placed in suitable positions they will rigidly support the frame *b*. The others can be then brought to any desired position for traveling, and the whole stage be moved in directions parallel to either of its sides. Further; if four components *a* are so placed that one is on the curve at each corner of *b*, then the part *b* can be rotated or slewed and gradually worked around to any desired position.

It will be obvious that if desired the component frame *b* may be made of other shape instead of oblong as shown.

In Figs. 12 to 17 I have shown various arrangements of the rollers and tracks by which the members may be mounted relatively to each other, and it will be readily seen that a single roller may be arranged to move between upper and lower tracks, or a pair of rollers may be arranged to run upon the upper and lower sides of a single track and that the rollers may be mounted in any preferred or convenient manner.

In Fig. 18 I have shown one form of moving the spuds or supports vertically, consisting of parallel levers fulcrumed upon the frame member and pivotally attached to the spuds so that by swinging the levers the spuds will be moved vertically with respect to the frame member and the weight of either member consequently shifted to the other member. By lowering the spuds of all the members of the apparatus, all the members will be held stationary.

Fig. 21 shows a stage with a component part $b$ similar to that shown by Figs. 19 and 20, but with straight outer sides, and the inner sides arranged to form a circle. This can be made to travel in both directions parallel to the sides in the same way as the stage shown in the previous figures and slewed or rotated if supported by three or four components $a^5$ $a^6$ and $a^7$ mounted on the inside circle.

The chief feature of novelty in connection with the three previously described figures consists in the arrangement of the spuds whereby they can be moved or translated, with their entire vertical motion mechanism, to any point of the "bridge frame."

It is obvious that the shapes and combinations of the component parts can be varied to meet any requirements of travel or relative movements.

Any tools, appliances or constructions, such as submarine diving apparatus, salvage plant, dredging appliances, pumps, boring, drilling and excavating machinery, piledrivers, block-setters, cranes and conveyers can be mounted upon either of the components, if suitably arranged for the purpose. In the case of piers, parts of the permanent structure can be temporarily used in the place of either one or the other component of the stage as depicted in Fig. 22 of the drawings, the locomotive stage traveling ahead as the permanent work is executed and completed by its aid; thus some of the component parts could be omitted, and their place taken by the last completed portion of the pier under construction, upon which suitable temporary and removable tracks would be arranged. In this case, it is possible to work with only four spuds, and if the component $b$ is provided with wide tracks it is quite possible as applied to a pier to obtain any range of movement required by gradually slewing or working the spuds about.

The spuds of all the frame members are movable vertically, and they may be moved vertically by any convenient mechanism. Several methods of accomplishing this result are set forth in my previous application hereinbefore mentioned. When it is desired to move either member relatively to the other member the spuds of the member to be moved are raised and the said member may be then moved either diametrically of the other member, or may be caused to describe a complete circle about the other member, and the tools or the working machinery may be thus brought to any desired point according to the exigencies of any particular circumstances. When the desired adjustment has been effected, the spuds of the moving member are lowered so that the parts will be held in the position to which they have been adjusted.

What I claim and desire to secure by Letters Patent of the United States is:—

1. A staging comprising inner and outer members relatively movable on each other in a horizontal plane, one member having an endless track for the other member, and said other member having means for its linear movement with respect to the first member, and supports on both members movable with relation thereto in a direction substantially perpendicular to the relative movements of the members, whereby each member may be made to describe a complete circle and also may be moved linearly in a horizontal plane.

2. A staging comprising a plurality of members relatively movable in a horizontal plane, a circular track on one of the members, carrying means on another member arranged to travel on said track, and vertically movable supports for both members whereby either member may be made to describe a complete circle in a horizontal plane.

3. A staging comprising, in combination, an outer member, an inner member, a circular track on the outer member, bridge members connecting with the inner member, rollers on the bridge members runing on said circular track, tracks on said bridge members, rollers on the inner member running on said tracks, and movable supports for both members whereby either member may describe a complete circle about the other member.

4. A staging comprising, in combination, an outer member, an inner member, a circular track on each member, bridge members spanning both inner and outer members, rollers on the bridge members running on the circular track of the outer member, auxiliary bridge members spanning the first mentioned bridge members and the inner member, rollers on the auxiliary bridge members running on the circular track on the inner member, and supports for both members whereby either or both members may be held stationary.

5. A staging comprising relatively movable members, bridge members connecting the relatively movable members, a circular track on the inner member, rollers on said bridge members running on said track, and elongated supports for each of the relatively movable members, said elongated supports being movable lengthwise of themselves with relation to the respective movable members whereby either or both members may be held stationary without raising or lowering either member.

6. A staging comprising inner and outer structures relatively movable both rotatively and linearly on each other and provided with supports associated with each structure for respectively upholding both structures during the movement of either structure, one of said structures having curved portions constituting tracks for the other structure for rotative movement of either structure upon the other.

7. A staging comprising inner and outer structures relatively movable on each other, and vertically movable supports associated with each structure for respectively supporting both structures during the movement of either structure, one of the structures having curved portions constituting tracks for the other structure for rotative movement of either structure on the other, and said structures having means for the lineal movement of either structure.

8. A staging, comprising inner and outer members relatively movable on each other in a horizontal plane, and supports on both members connected thereto for movement with relation to the respective members in a direction substantially perpendicular to the relative movements of the members, one of the members being provided with a complete circular track having upper and lower portions and the other being provided with means for engaging the upper and lower portions of the track to uphold either member by the other for movement of said members relative one to the other in a complete circle, and the staging having means for the linear movement of either member with reference to the other.

In testimony, that I claim the foregoing as my invention, I have signed my name in presence of two subscribing witnesses.

R. A. A. S. PIERCY.

Witnesses:
JOHN GASKIN,
JOHN READMAN.

Copies of this patent may be obtained for five cents each, by addressing the "Commissioner of Patents, Washington, D. C."